Figure 1:
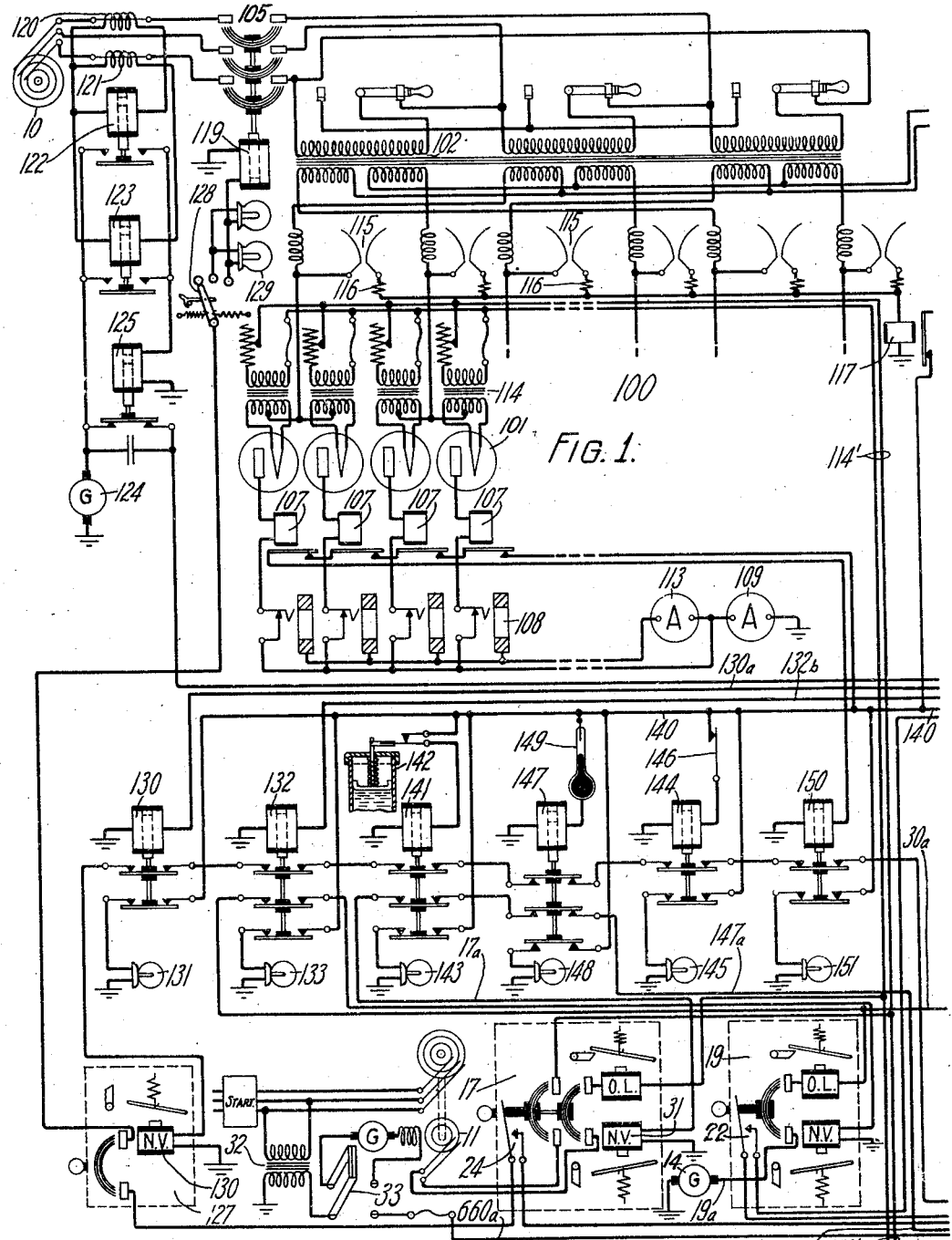

Jan. 13, 1931.  M. E. FULTZ  1,788,513
SIGNAL AND CONTROL SYSTEM
Filed Jan. 28, 1928  6 Sheets-Sheet 1

INVENTOR:
MILES E. FULTZ
By J. P. Neville
ATTORNEY

Jan. 13, 1931. M. E. FULTZ 1,788,513
SIGNAL AND CONTROL SYSTEM
Filed Jan. 28, 1928 6 Sheets-Sheet 3

INVENTOR:
MILES E. FULTZ
By J. P. Neville
ATTORNEY

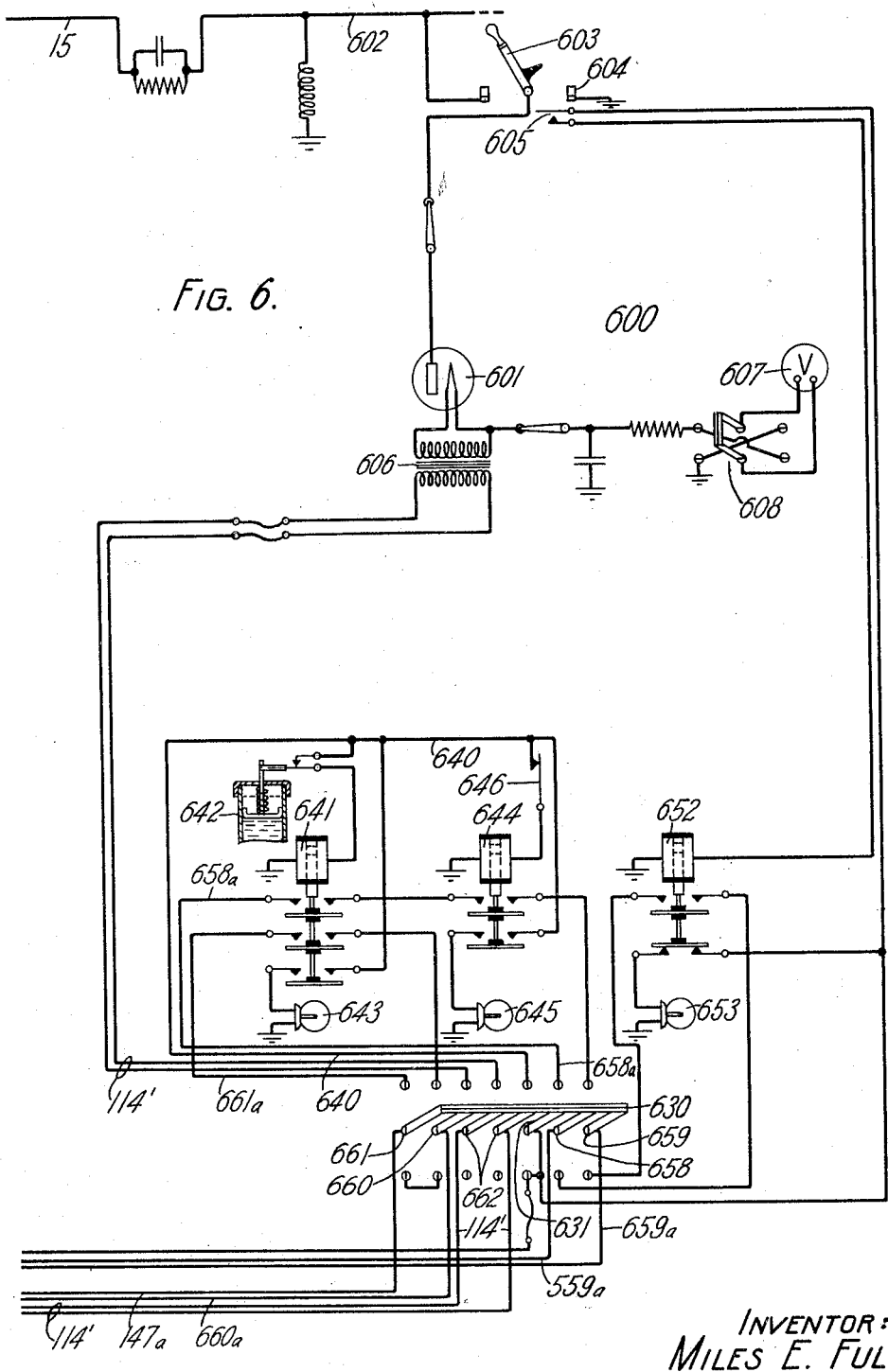

Patented Jan. 13, 1931

1,788,513

UNITED STATES PATENT OFFICE

MILES E. FULTZ, OF BROOKLYN, NEW YORK, ASSIGNOR TO BELL TELEPHONE LABORATORIES, INCORPORATED, OF NEW YORK, N. Y., A CORPORATION OF NEW YORK

SIGNAL AND CONTROL SYSTEM

Application filed January 28, 1928. Serial No. 250,155.

This invention relates to signal and control circuits for electric discharge devices and particularly for high power electric discharge devices of the water cooled type, and has for an object to provide an automatic signal and control circuit therefor.

Another object of the invention is to provide automatic means for completely de-energizing a system of electric discharge devices upon the occurrence of an undesirable operating condition.

A further object of the invention is to provide switching means for the signal and control circuit of a plurality of banks of electric discharge devices so that one or more of the banks may be operated while the others are held in reserve.

Previously, control systems have been employed in which the occurrence of an undesirable operating condition, such as a failure of the cooling water supply, would disconnect the supply of space current from the tubes. However, it has been found that even with such systems the tubes are likely to be injured before the cathode heating current can be manually disconnected.

The specific system to be herein described, which embodies the various features of the invention, comprises a three-stage amplifier circuit; the first stage including a single water cooled vacuum tube amplifier, the second stage including two similar tubes connected in parallel, and the third stage including three banks each comprising a plurality of parallel connected water cooled vacuum tubes. The three banks of the third stage are so arranged that under normal conditions, two are operated in parallel while the third is held in reserve. In addition to the three amplifier stages, there is provided a single water cooled tube which is employed in a peak voltmeter circuit. Plate current for all of the tubes is supplied from a six-phase rectifier in which there are also used water cooled vacuum tubes.

For the purposes of control, the system is divided up into six units, the apparatus comprising each unit being mounted in a separate wire cage. The first unit comprises the rectifier apparatus, the second unit comprises the first two amplifier stages, the third, fourth and fifth units comprise, respectively, the three banks of the third amplifier stage, and the sixth unit comprises the peak voltmeter circuit.

Each unit is provided with a group of relay operated switches. One relay for each unit is controlled by a switch associated with the door of the cage which encloses it, and a second is associated with a cooling water circulating system of the tubes of that unit. This second relay will be operated if the rate of flow of cooling water falls below a certain predetermined value. The rectifier and amplifier units are also each provided with one relay which is operated when the temperature of the cooling water exceeds a predetermined value, and with a second relay which is operated by an increase, above a predetermined value, in the plate current supplied to any tube of the unit. In addition there are provided relays which are operated by the discharge of horn gaps associated with the grid and plate bus-bars or conductors.

Associated with the circuit is a control and signal system comprising a master control circuit and two auxiliary control circuits.

The master control circuit includes the contacts of all of the above mentioned relays and also of inter-locking relays which are associated with each of the three units constituting the third amplifier stage. The inter-locking relays are so arranged that plate current cannot be supplied to the tubes of any of the units of that stage until after biasing potential has been applied to the grids of the tubes in that unit. The control circuit is supplied with current from the source of grid biasing potential and is arranged to operate a no-voltage release coil of a circuit breaker connected in the holding coil circuit of the three-phase oil switch or circuit breaker through which power is supplied through the rectifier unit to the amplifier system.

One of the auxiliary circuits includes contacts of the water flow controlled relays of the rectifier and peak voltmeter units and contacts controlled by the water temperature controlled relay of the rectifier unit.

This auxiliary circuit controls a no-voltage release coil of the circuit breaker through which heating current is supplied to the filaments of the rectifier and peak voltmeter tubes.

The second auxiliary control circuit includes contacts of the water flow and water temperature controlled relays of each of the amplifier units. This circuit controls a no-voltage release coil of the circuit breaker through which heating current is supplied to the filaments of the amplifier tubes.

The circuit of the holding coil of the three phase oil switch includes in series the circuit breaker associated with the master control circuit, contacts associated with the circuit breaker for supplying heating current to the filaments of the rectifier and voltmeter tubes, contacts associated with the circuit breaker of the amplifier filament heating circuit, contacts associated with the circuit breaker included in the grid biasing potential supply circuit, and contacts associated with a switch for grounding the plate bus-bar. The opening of any of these circuit breakers, or closing of the plate bus-bar grounding switch will cause the oil switch to open and thereby disconnect the power source from the rectifier circuit.

The organization principle of operation, together with the objects and features of the invention will be more readily understood by reference to the following detailed description taken in connection with the drawing in which Figs. 1 to 6 placed side by side show one specific embodiment thereof applied to a three stage high power amplifier system.

Referring to the drawing there is shown a three stage high power amplifier circuit. The first stage comprises a single water cooled space discharge tube 201, the second stage comprises two parallel connected water cooled space discharge tubes 202, and the third stage comprises three banks 300, 400 and 500 of parallel connected water cooled space discharge tubes. Banks 300 and 500 are identical and each comprises ten parallel connected tubes 301 and 501, respectively, only four of which are shown in each bank. Bank 400 comprises fifteen parallel connected tubes 401, only two of which are shown. Banks 300, 400 and 500 are so arranged that any or all may be operated at one time as hereinafter described. Normally two banks are operated in parallel and the remaining one is held in reserve. A peak voltmeter 600 employing a two element water cooled space discharge tube 601 is connected to the output of the third stage.

*Rectifier circuit*

Space current for the amplifier tubes is supplied from a six phase rectifier 100 which comprises twelve two-element water cooled space discharge tubes 101, only four of which are shown. These tubes are connected in the usual manner through the multi-phase transformer 102 and the oil switch or circuit breaker 105 to the high voltage three phase source 10 to constitute a six phase rectifier, two tubes are connected in parallel in each side of each phase.

The plates of the tubes are respectively connected through the relays 107, jacks 108 and ammeter 109 to ground.

The other side of the rectifier circuit is connected through inductance coils 110 and 111 (Fig. 2) to the plate bus 12. The jacks 108 provide a means for connecting the meter 113 to measure the current supplied to the bus-bar 12, through the respective rectifiers.

Heating current is supplied to cathodes of the rectifier tubes from the alternating current generator 11 through the circuit breaker 17, conductors 114' and the transformers 114. The plate supply circuit for the rectifiers is provided with horn gaps 115 to prevent excess voltages in the line from being applied to the rectifiers.

Resistances 116 are connected in each horn gap circuit to limit the current which is supplied to the relay 117 when the respective horn gap arcs over. The contacts of the relay 117 are connected in one of the control circuits, so that current flowing through any of the horn gaps will operate the relay 117 to open the oil circuit breaker 105, as will be hereinafter described.

A switch 20 (Fig. 2) is provided for grounding the plate bus-bar 12 when the amplifier system is not in use. This switch is provided with auxiliary contacts 21 which, as will be described later, prevent the operation of the system except when the switch is in the correct position.

The amplifier tubes are supplied with cathode heating current from a three phase alternating current generator 13 (Fig. 2) through circuit breaker 18. Biasing potential is supplied to the grids of the tubes in the several amplifier stages from a 275 volt direct current generator 14 (Fig. 1) through circuit breaker 19 and conductor 19a.

Filters 204, 205 and 206 are provided for eliminating ripples from the potential applied to the grids of tubes 201, 202 and to the grids of the tubes in banks 300, 400 and 500, respectively. The biasing potential for banks 300, 400 and 500 is supplied over the conductor 206a. A ball spark gap 207 is connected in the output of the filter 206 to prevent the application of excessive grid voltages to the tubes.

The resistance 208 limits the current which flows through the winding of the relay 209 when the gap 207 arcs over. The operation of the relay 209 opens the oil circuit breaker 105, as will be hereinafter described.

Unit 200

Cathode heating current for the tubes 201 and 202 is supplied from source 13 through contacts 262 of switch 230 and the transformers 210 and 211 respectively. Space current for these tubes is supplied from the bus 12 through switch 212. Retard coils 213 and 214 are connected in the plate circuits of the tubes 201 and 202 respectively to prevent coupling between the plate circuits of the tubes in the two amplifier stages through the plate current supply circuit.

When switch 212 is closed in the right-hand position the plates of the tubes 201 and 202 are grounded and the auxiliary contact 215 is closed to operate the relay 252, to be hereinafter referred to, and complete the main control circuit. This arrangement insures that, when the first two amplifier stages are not in use, the plates of the tubes are grounded before the rest of the circuit can be operated, as will be later described.

A horn gap 220 is provided to prevent the application of excessive voltages to the plates of the tubes 201 and 202. The resistance 221 limits the current which flows through the winding of the relay 222 when the gap 220 arcs over. Operation of the relay 222 causes the oil switch 105 to be opened in the same way as the operation of relay 117 effects this function.

A resistance 223 is connected in shunt to the cathode of the tube 201, and a relay 224 is connected in the plate current path of the tube between the mid-point of the resistance 223 and ground.

Similar relays 225 are connected in the plate current circuits of the tubes 202, between the mid-points of resistances 226 and ground. The contacts of the relays 224 and 225 are connected in the circuit including relay 250 having a contact in the main control circuit, so that, if the space current supplied to any of the tubes 201 and 202 exceeds a predetermined value, the power supply source will be disconnected from the system by the operation of oil switch 105.

The output of the amplifier tube 201 is coupled to the input of the tubes 202 by means of resistance 216. Similarly, the networks 218, 219 and 403 (Fig. 4) provide means for coupling the output circuit of the tubes 202 to the amplifier banks 300, 400 and 500.

Units 300, 400 and 500

The input circuits of the banks 300, 400 and 500 are connected in parallel by means of the delta impedance network 403. Switches 304, 404 and 504 are provided for connecting the grid circuits of the respective banks 300, 400 and 500 to the terminals of the network 403. By means of the network and switches 304, 404 and 504 any one or more of the banks may be connected for operation, or any two may be operated in parallel, while the others or other are held in reserve.

Switches 304, 404 and 504 are provided with grounded contacts 305, 405 and 505, respectively. When the bank controlled by either switch is not being operated, the associated switch will be thrown to engage its grounded contact, whereby the grid circuit will be connected directly to the ground.

Associated with the switches are auxiliary contacts 306, 406 and 506, respectively, connected in circuit with the relays 356, 456 and 556, each having a contact in the main control circuit, as will be described later, the relays 356, 456 and 556 operate, when any bank is connected for operation, to prevent the application of energizing potential to the plates of the tubes in that bank until after the grid biasing potential has been applied to the grids of the tubes.

Plate current for the banks 300, 400 and 500 is supplied from the bus-bar 15 which is connected to the main bus-bar 12 through the high frequency choke coil 16 (Fig. 2), which is provided to prevent coupling between the plate circuits of these banks and of the tubes of unit 200.

A horn gap 227 (Fig. 2) is connected to prevent the accumulation of voltages upon the bus 15. A resistance 228 is associated with the horn gap to limit the current through the relay 229 when the gap 227 arcs over. When relay 229 operates, due to current flowing across the horn gap, the main control circuit is opened to cause operation of the oil circuit breaker 105, whereby the power supply circuit is disconnected from the rectifier 100.

Switches 307, 407 and 507 are provided for connecting the plates of the tubes of the respective banks to the bus-bar 15. The switches are equipped with ground and auxiliary contacts 308 and 309, 408 and 409, and 508 and 509, respectively. The contacts 308, 408 and 508 provide means for grounding the plates of the tubes in the respective banks when the banks are not connected for operation. The auxiliary contacts operate in conjunction with the auxiliary contacts of the switches 304, 404 and 504, respectively, to prevent the application of potential to the plates of the tubes before biasing potential has been applied to their grids and to assure that, when any of the banks 300, 400 or 500 are not in use, their plate circuits are grounded before the rest of the system can be operated.

The organization and circuits of banks 300 and 500 are identical. The construction of bank 300 will be herein described and is to be understood as applying to both banks.

Cathode heating current for the tubes 301 is supplied from the generator 13 (Fig. 2) through the conductors 13A, contacts 362 of switch 360 and transformer 302. Grid biasing potential is supplied through the filter 206 (Fig. 2), as hereinbefore described. Networks 303 are connected to the plates to prevent the generation of undesirable oscillations in the tube circuits of bank 300.

A relay 310 is connected in the plate current circuit of each tube. The contacts of these relays are connected in series in one of the control circuits, to be hereinafter described, so that, if the plate current of any tube exceeds a predetermined value, the oil switch 105 will be operated to cut off the power supply to the system. The jacks 311, connected in series with the relays, provide means whereby the ammeter 312 may be connected in the plate circuit of each tube to measure the space current supplied to it. A condenser 313 is connected in shunt to each of the relays to provide a path for the amplified alternating current.

Heating current for the cathodes of tubes 401 is supplied over the circuit 13a through contacts 462 of switch 460 and the autotransformer 414 and the individual transformers 415.

Networks 416 are provided to prevent the establishment of undesirable oscillations in the circuits of the tubes included in bank 400.

Relays 410 are connected in the plate current path between the midpoints of the secondary windings of the transformers 415 and ground. The contacts of each relay 410 are connected in circuit with the relay 450 having a contact in the main control circuit. If the plate current supplied to any tube in the bank exceeds a predetermined value the relay 450 will be deenergized to open the main control circuit, whereby the oil switch 105 will open to disconnect the power supply circuit from the system.

Condensers 413 are effectively in shunt to the relays 410 and provide a path for the amplified alternating current. Jacks 411 are provided so that the plate current supplied to each tube may be measured by means of the ammeter 412.

Unit 600

The peak voltmeter circuit 600 is connected to the output lead 602 through the switch 603. This switch is provided with a ground contact 604, by means of which the plate of the tube 601 may be grounded when the voltmeter circuit is not in use. Switch 603 is also provided with auxiliary contacts 605 which are closed when the switch 603 is in position to connect the plate of 601 to ground. Contacts 605 are connected to the relay 652 having a contact in the main control circuit, to be hereinafter described, so that, when the voltmeter is not in use, the plate of the tube must be grounded before the system can be put into operation.

The voltmeter circuit comprises the two element water-cooled vacuum tube 601, and the voltmeter 607 connected between the cathode of the tube 601 and ground through a reversing switch 608. Heating current is supplied to the cathode of tube 601 from the generator 11 (Fig. 1) over the circuit 114' through contacts 662 of switch 630 and the transformer 606.

Control circuits

The leads from the three phase generator to the oil switch 105 are provided with current transformers 120 and 121 which are respectively connected to the relays 122 and 123. The contacts of relays 122 and 123 are connected in parallel between the generator 124 and the relay 125, so that the operation of either of the relays 122 or 123, due to excessive current in the three phase leads, will cause the operation of the relay 125.

The oil switch 105 is provided with an electromagnetic holding coil 119. When the system is in operation the switch 20 (Fig. 2) will be thrown to the right to close the contacts 21. Operating current is supplied to the holding coil 119 from the direct current generator 124 through the series circuit, comprising contacts of the relay 125, auxiliary contacts 21 of the switch 20 (Fig. 2), auxiliary contacts 22 of circuit breaker 19 (Fig. 1), auxiliary contacts 23 of the circuit breaker 18 (Fig. 2), auxiliary contacts 24 of the circuit breaker or switch 17, circuit breaker 127, and switch 128. The circuit breakers 19, 18 and 17 are, respectively, provided with the contacts 22, 23 and 24 to cause the oil switch 105 to be opened immediately upon the opening of any of these circuit breakers, whereby the power line is disconnected from the rectifier 100.

The switch 128 may be operated in any of three positions: a right or closing position, a middle or operating position and a left position in which it may be locked open. When the switch is in the middle position, the parallel connected signal lamps 129 permit sufficient current to flow through holding coil 119 to hold the circuit breaker 105 closed. However, this current is not sufficient to move the circuit breaker from the open to the closed position. When it is desired to bring the circuit into operation, the switch 128 is moved from the locked left hand position to the central position lighting the lamps 129 which are distributed throughout the plant, thus giving an indication that power is about to be applied to the system. A short interval thereafter the switch 128 is moved to the right hand contact thus applying current directly to the holding coil 119 and causing the oil circuit breaker 105 to close. When the switch 128 is released it returns automatically to the central position, in which position the lamps 129 are lighted and sufficient current flows through holding coil 119 to hold the circuit breaker 105 closed.

The circuit breaker 127 is provided with a no-voltage release coil 130 which is connected in the main control circuit.

The main control circuit includes the contacts of a number of relays associated with each of the units of the system, so that the opening of the contacts of any of the relays will open the circuit including the coil 130 thereby releasing the circuit breaker 127 and opening the circuit of the holding coil 119, whereby the oil switch 105 opens to disconnect power from the rectifier 100.

A signal lamp is associated with each of the relays to indicate the condition of the system as will be hereinafter described in detail.

Figure 2:
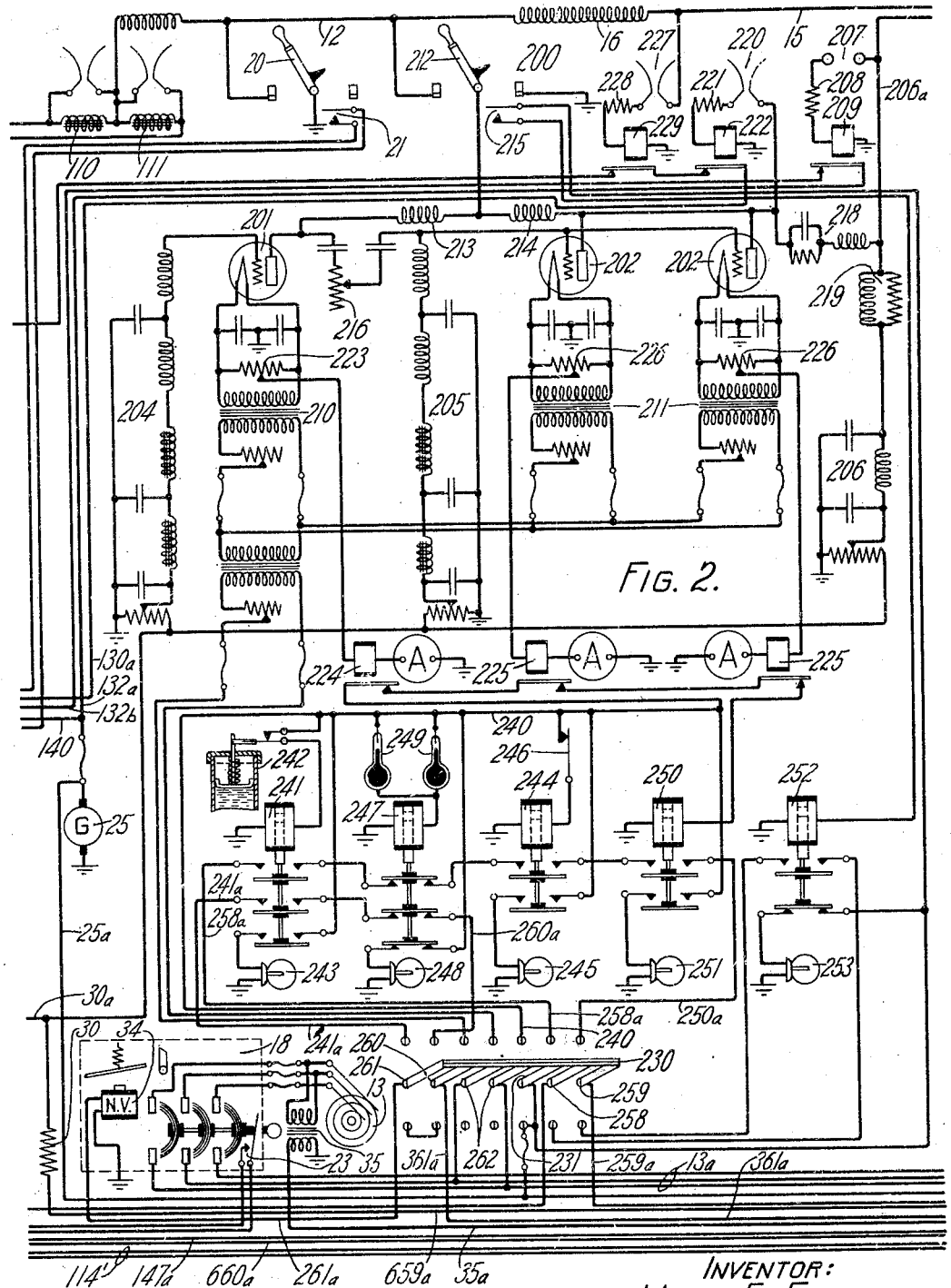

Operating current for the relays of the control circuits and for the signal lamps associated therewith is supplied from a direct current generator 25, (Fig. 2). This generator is connected through a bus 140 to the relays associated with the rectifier unit and through a conductor 25a and the contact blades 231, 331, 431, 531 and 631 of the switches 230, 330, 430, 530 and 630, to the bus-bars 240, 340, 440, 540 and 640, respectively, of the other units.

The switches 230, 330, 430, 530 and 630 are provided with contact blades for connecting the filament heating circuits individual to the various units, to this supply circuit 13a. In addition, these switches provide means whereby the control circuits may be by-passed around an idle unit or units. When closed in their upper positions, the switches 230, etc. serve to connect the supply line 13a to the filament heating circuit and the control circuit individual to the respective operative units. When closed in their lower positions, the above mentioned switches engage contacts to by-pass the control circuits individual to an idle unit or units, but to include the control circuits associated with succeeding operative units, as will appear later.

The winding of relay 130 (Fig. 1) is connected, by a conductor 130a to the bus-bar 140, and the contacts of relays 222 and 229 (Fig. 2) and 117 (Fig. 1), so that the operation of any of the relays 222, 229 or 117 will cause the relay 130 to release. A signal lamp 131 is associated with the lower armature and contacts of this relay. A similar relay 132 is connected through conductors 132a and 132b, and contacts of relay 209 to the bus-bar 140. This relay will be similarly released by the operation of the relay 209. A signal lamp 133 is associated with the lower armature of this relay.

The units are provided with relays 141, 241, 341, 441, 541 and 641, the windings of which are connected to the respective relay buses through the contacts of the water flow control valves 142, 242, 342, 442, 542 and 642, respectively, so that the relays will be released when the water flow in any unit falls below a predetermined value. Signal lamps 143, 243, 343, 443, 543 and 643 are associated with the lower armatures of the respective relays.

Each unit is also provided with relays 144, 244, 344, 444, 544 and 644, respectively. The windings of these relays are connected to the respective relay buses through the cage gate-switches 146, 246, 346, 446, 546 and 646 respectively, so that the opening of any cage gate will cause the release of the respective relay. Signal lamps 145, 245, 345, 445, 545 and 645 are associated with the lower armatures of the respective relays.

The units 100, 200, 300, 400 and 500 are provided with relays 147, 247, 347, 447 and 547 respectively. These relays are connected to the respective relay buses through thermometer controlled switches 149, 249, 349, 449 and 549, respectively. The thermometers are associated with the cooling water so that when the temperature of the cooling water for any unit exceeds a predetermined value the corresponding relay will be operated. Signal lamps 148, 248, 348, 448 and 548 are associated with the lower armatures of the respective relays.

Each of the units 100, 200, 300, 400 and 500 is provided with relays 150, 250, 350, 450 and 550 respectively. The windings of these relays are connected to the respective relay buses through the contacts of relays 107, 224 and 225, 310, 410 and 510, respectively, so that the respective relays will be released whenever the plate current supplied to any tube of any unit exceeds a predetermined value. Signal lamps 151, 251, 351, 451 and 551 are associated with the lower armatures of these relays.

The units 200 and 600 are provided with relays 252 and 652, respectively. The windings of these relays are connected to the respective relay buses through the auxiliary contacts 215 and 605 of disconnect switches 212 and 603 respectively. Signal lamps 253 and 653 are associated with the lower armatures of the respective relays.

The units 300, 400 and 500 are each provided with relays 354 and 356, 454 and 456, and 554 and 556, respectively. The winding of relay 354 is connected through the auxiliary contact 309 of switch 307 to the direct current supply. The winding of the relay 356 is connected to the auxiliary contacts 306 of the switch 304 (Fig. 4) to the direct current supply. The windings of relays 454, 456, 554 and 556 are associated with the auxiliary contacts of the corresponding switches, namely, 407, 404, 507 and 504, of the units 400 and 500. Signal lamps 355 and 357, 455 and 457, and 555 and 557 are associated with the lower armatures of the respective relays. As noted above, these relays are controlled by the grid and plate circuit switches, so that the potential cannot be supplied to the plates of the tubes of the respective units before biasing potential has been applied to their grids.

When the system is operating under normal conditions, all signal lamps will be lighted, and each lamp will be extinguished by the operation of the relay controlling it, to indicate the source of the trouble. This arrangement is preferable to the scheme in which all the signal lamps are dark, when the tube system is operating normally. In the dark lamp system, trouble of a particularly undesirable nature may occur in the tube system and may not be indicated because a signal lamp has burned out. However, this cannot occur in the light lamp system, because the presence of a dark signal lamp immediately warns the operator that something is wrong. Inspection will determine whether the trouble is in the circuits of the tube system or in the signal lamp.

The main control circuit can be traced from ground through: no-voltage release coil 130 of circuit breaker 127, upper armatures of relays 130, 132, 141, 147, 144 and 150, contact 258 of switch 230, conductor 258a, upper armatures of relays 241, 247, 244 and 250, conductor 250a, contact 259 of switch 230, conductor 259a, contact 358 of switch 330, conductor 358a, upper armatures of relays 341, 347, 344, 350, middle armature of relay 356, contact 359 of switch 330, conductor 359a, contact 458 of switch 430, conductor 458a, upper armatures of relays 441, 447, 444 and 450, middle armature of relay 456, contact 459 of switch 430, conductor 430a, contact 558 of switch 530, conductor 558a, upper armatures of relays 541, 547, 544 and 550, middle contact of relay 556, contact 559 of switch 530, conductor 559a, contact 658 of switch 630, conductor 658a, upper contacts of relays 641 and 644, contact 659 of switch 630, conductor 659a, resistance 30, conductor 30a, overload release coil of circuit breaker 19, conductor 19a, and generator 14 to ground. Should any contact included in the main circuit open, the circuit breaker 130 will be released to break the circuit through the holding coil 119 and the oil switch 105 will be opened to disconnect the power supply circuit from the rectifier 100.

Figure 3:
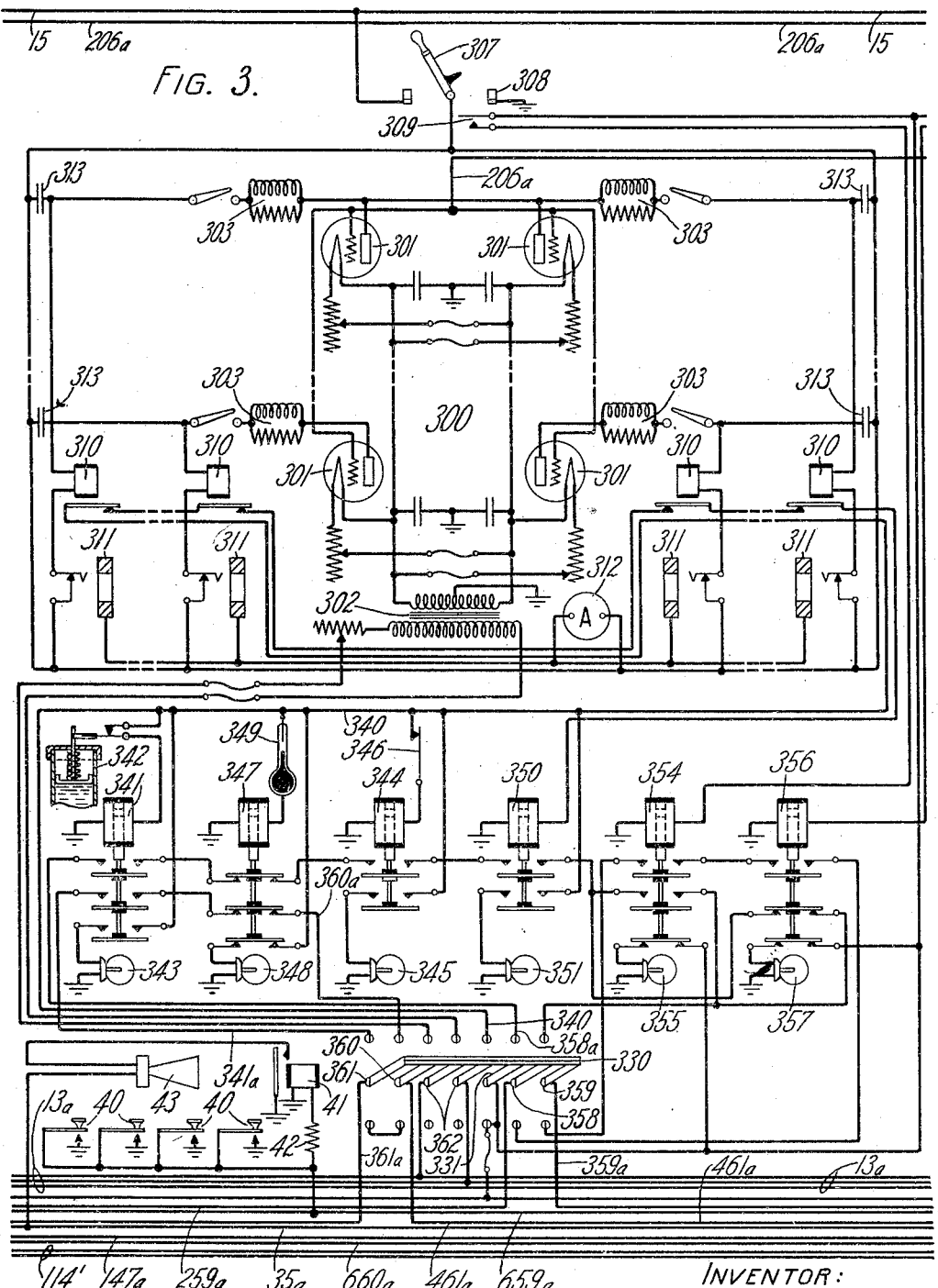
Figure 4:
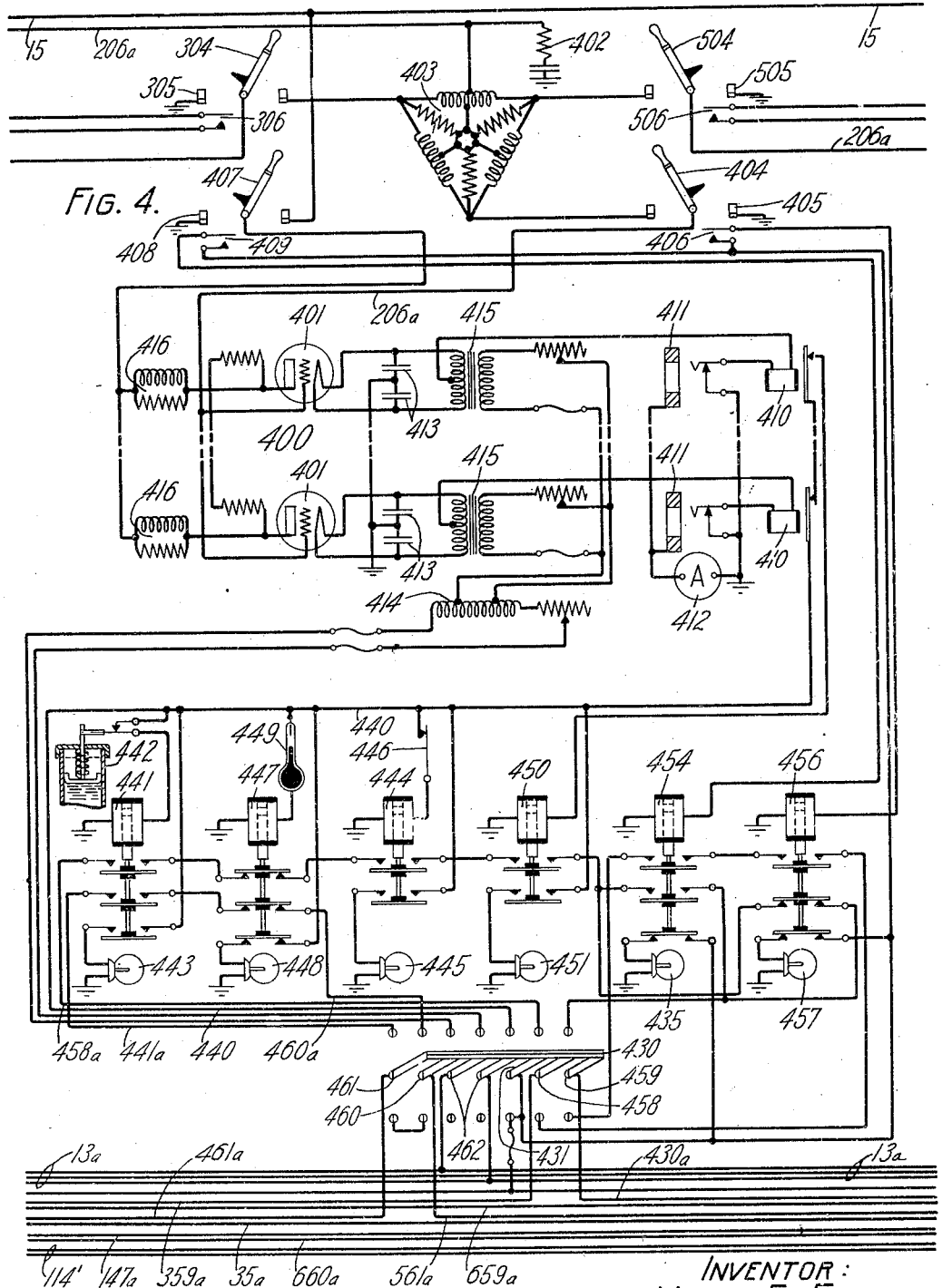
Figure 5:
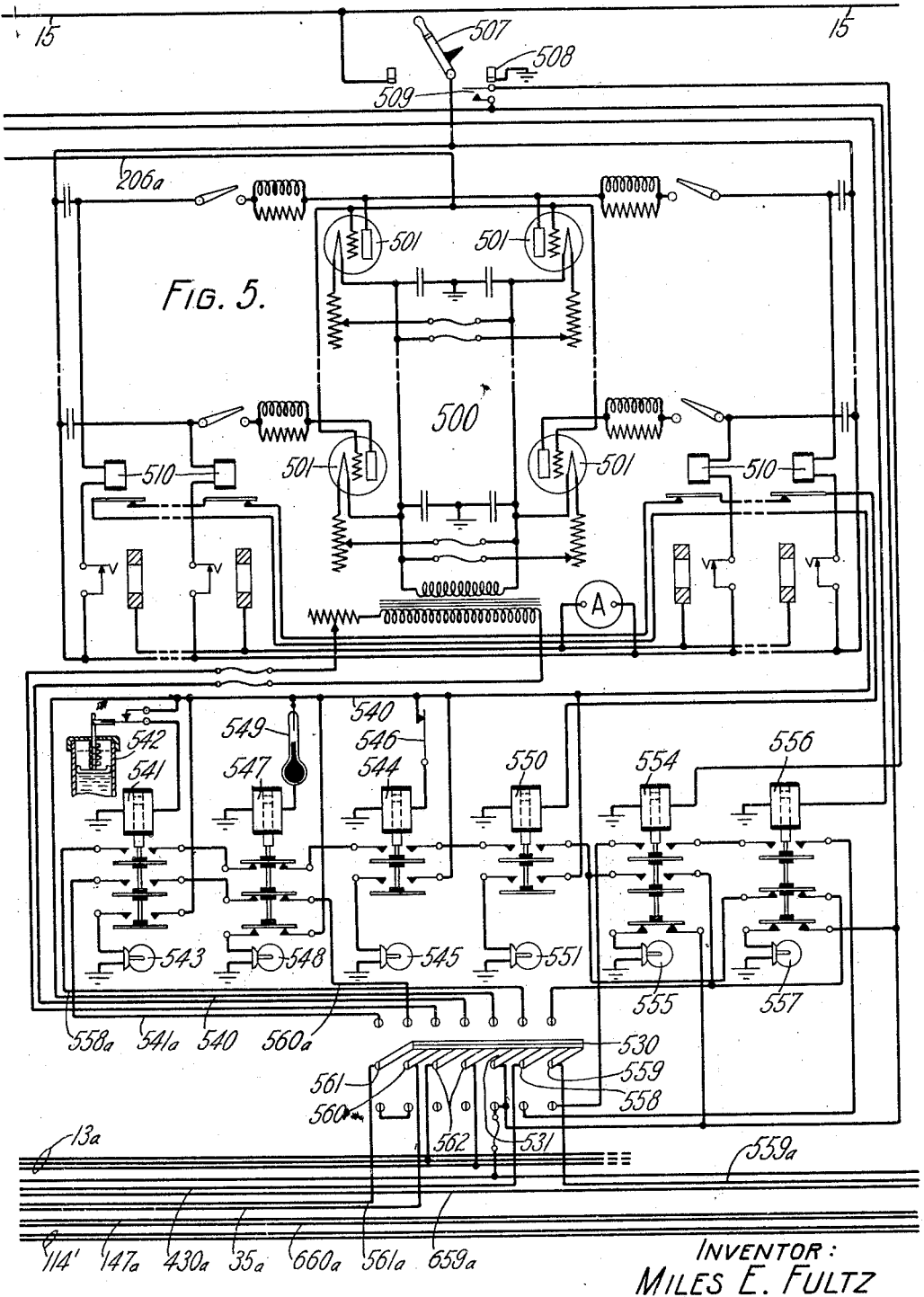

In Fig. 3, there is shown a series of push button switches 40, connected between the ungrounded side of the main control circuit and ground. The switches 40 are distributed throughout the plant. In case of emergency any one of these switches may be operated to ground the control circuit, whereby the circuit breaker 127 will open to de-energize the holding coil 119 and thereby cause the oil switch 105 to open. The resistance 30 serves to limit the current flowing through the main control circuit when one of the switches 40 is actuated. A relay 41 is also connected between the ungrounded side of the main control circuit and ground, through a resistance 42. In case the low resistance path to ground through the contacts of the control relays is broken, current flows to ground through the winding of the relay 41. Its contacts are closed to complete a circuit to ground through the actuating coil of signal device 43, which may be an automobile horn.

An auxiliary control circuit is provided for controlling the supply of cathode heating current to the tubes 101 and 601. This circuit is arranged to control the current through the no-voltage release coil 31 of the circuit breaker 17, and may be traced from ground through the no-voltage release coil of the circuit breaker 17, conductor 17a, the middle contact of relays 141 and 147, conductor 147a, contact 661 of switch 630, conductor 661a, middle armature of relay 641, contact 660 of switch 630, conductor 660a, switch 33, one winding of transformer 32 to ground. When the system is in operation the switch 33 is closed to complete the circuit to the transformer winding and to complete the field circuit of alternator 11. Operation of any of the relays in the auxiliary control circuit will release the circuit breaker 17 to open the filament heating current circuit 114' for the tubes 101 and 601.

A second auxiliary control circuit is provided for controlling the cathode heating current for the tubes 201, 202, 301, 401 and 501, which is supplied by the generator 13 through the circuit breaker 18. Control is effected by means of a circuit including the no-voltage release coil 34, associated with the circuit breaker 18. The circuit may be traced from ground through the transformer 35, conductor 35a, through contact 560 of switch 530, conductor 560a, middle armatures of relays 547 and 541, conductor 541a, contact 561 of switch 530, conductor 561a, contact 460 of switch 430, conductor 460a, middle armatures of relays 447 and 441, conductor 441a, contact 461 of switch 430, conductor 461a, contact 360 of switch 330, conductor 360a, middle armatures of relays 347 and 341, conductor 341a, contact 361 of switch 330, conductor 361a, contact 260 of switch 230, conductor 260a, middle armatures of relays 247 and 241, conductor 241a, contact 261 of switch 230, conductor 261a, and through no-voltage release coil 34 to ground. When any of the contacts of this circuit are opened, the circuit breaker 18 will be released to disconnect the source 13 which supplies heating current to the cathodes of the tubes included in the units 200, 300, 400 and 500.

Contacts 262, 362, 462, 562 and 662 of the switches 230, 330, 430, 530 and 630, respectively, provide means for connecting the different phases of the cathode heating current circuit 13a to the cathodes of the tubes included in the respective units.

*Operation*

Let us assume, for example, that it is desired to operate the amplifier system to include the stages of unit 200 connected in tandem to the banks 300 and 400 connected in parallel and to hold the bank 500 in reserve.

First it will be necessary to close switches 230, 330, 430 and 630 in their upper or operative positions and switch 530 in the lower or inoperative positions.

In starting up the circuit it is also assumed that the switches 20, 212, 307, 304, 407, 504, 404, 507 and 603 are closed in their grounded positions. When switches 504 and 507 are in these positions, the relays 554 and 556 will both be operated thus providing a closed circuit through their upper armatures between the switch arms 559 and 558 for the main control circuit. If either of the switches 504 or 507 is not in the grounding position, this circuit will be opened and it will be impossible to hold the oil switch 105 closed. The water flow to cool the plates of the amplifier and rectifier tubes is turned on, causing the plungers of the control devices 142, 242, 342, 442, 542 and 642 to be raised, closing their contacts. The relay circuits are energized by starting the generator 25. Under this condition, all of the relays necessary to normal operation will be actuated to close the contacts in the control circuits. Heating current is supplied to the cathodes of the tubes by closing the circuit breakers 17 and 18. The grid biasing potential circuit is energized by closing the circuit breaker 19. The circuit breaker 127 is then closed and after the switch 20 is moved to its right hand position and switch 212 to its left hand position, the oil switch 105 is operated by the operation of the switch 128 as described above. The rectifier unit 100 will then be operative with all of the signal lights 131, 133, 143, 148, 145 and 151 lighted.

The occurrence of any undesirable operating condition in the rectifier circuit 100 will cause the operation of a corresponding relay to disconnect the power supply circuit from the amplifier and to extinguish the corresponding signal lamp, whereby the source of the trouble is indicated. For example, if any of the horn gaps 115, 227 or 220 arcs over the corresponding relay 117, 229 or 222 will be operated to open the circuit through the coil of the relay 130, thereby causing it to release and thereby open the main control circuit. Similarly, if the grid spark gap 207 arcs over the relay 209 will be operated to open the circuit through the coil of the relay 132.

These operations which put the unit 100 into operation also bring the unit 200 into operation. This unit will now operate with the signal lamps 243, 248, 245, 251 and 253 lighted. If the water flow falls below the required minimum the plunger of the control device 242 will drop, opening the plunger contacts and releasing relay 241 and opening the control circuits to disconnect the plates and filaments from their supply sources and to extinguish the light 243, whereby the source of the trouble is indicated. Similar action takes place if the temperature of the cooling water exceeds the maximum, if the cage gate is opened, or if the plate current exceeds the desired maximum.

To bring the unit 300 into operation it is necessary to first close the switch 304 from the grounded to the right hand or closed position and then to move the switch 307 from the grounded to the left hand or closed position. These operations first supply grid biasing potential to the tubes of bank 300 and then plate potential. If the order of operation is reversed the main control circuit will be opened causing the release of the oil switch 105. This fact can be evident from an examination of the circuits of relays 354 and 356. If both the switches 304 and 307 are in their grounded positions, both the relays 354 and 356 will be operated and the main control circuit will be closed through the middle armature of the relay 354. When the switch 304 is moved to its closed position the relay 356 will be released to complete the main control circuit through the middle armature of that relay in parallel with the middle contact of relay 354. When the circuit through the middle armature of the relay 354 is opened, due to the release of that relay by the closing of the switch 307, the main control circuit will remain closed. However, if the switch 307 is closed in its operative position before the switch 304, the main control circuit will be opened at the middle contact of 354, because this relay is deenergized, and the oil switch 105 will be released.

A similar set of operations are required to bring the unit 400 into operation.

All that is required to bring the voltmeter circuit 600 into an operating condition is to move the switch 603 from its grounded position to the left hand or closed position. When the units 300, 400 and 600 are operating, their corresponding signal lamps will be lighted and if any undesired operating condition occurs, the corresponding relay will be operated to disconnect the power and extinguish the respective light to indicate the trouble.

If for any reason it is desired to substitute the bank 500 for either of the banks 300 or 400, it is necessary to shut down the system, to rearrange the control circuit switches 330 or 430, and 530 to permit the use of the desired banks, after which, the modified system is brought into operation by a series of operations similar to that described above.

What is claimed is:

1. A high power transmitter comprising an amplifier system having a plurality of stages, a rectifier system for applying space current to said amplifier system, said systems including water cooled space discharge devices, means for maintaining a circulation of cooling water, a source of cathode heating current for said devices, an alternating current source for supplying space current to the rectifying devices, a master control circuit including means controlled by said cooling water for controlling the connection of said alternating current source to said rectifier, and an auxiliary control circuit including means controlled by said cooling water for controlling the connection of said source of cathode heating current to said devices.

2. A high power transmitter comprising an amplifier system having a plurality of stages, each including water cooled space discharge devices, a source of cathode heating current and a source of space current for said devices, a control system including means individual to each stage and responsive to different undesired operating conditions therein for controlling the connection of said sources to said devices, means for connecting certain of said stages together for joint operation and for rendering at least one other stage inoperative, and switching means in the control system for including therein the means controlling the connection of said sources to the operative stages and for by-passing the connection controlling means of the inoperative stages.

3. A high power transmitter comprising an amplifier system including a plurality of stages, each having water cooled electric discharge devices, a source of cathode heating current and a source of space current for said devices, a control system comprising a plurality of means individual to each stage and responsive to different undesired operating conditions in that stage, and means controlled by said responsive means for controlling the connection of said sources to the discharge devices, and a circuit including a signal device associated with each of said responsive means.

4. A high power transmitter comprising an amplifier system including a plurality of stages, each stage including water cooled electric discharge devices, each having a cathode, an anode and a control electrode, a source for supplying heating current to said cathodes, a source for supplying biasing potential to said control electrodes, a source for supplying space current to said devices, switching means for connecting said sources to said devices, control circuits associated with said system including a plurality of means individual to each stage for controlling the operation of the cathode heating current and space current switching means, a plurality of means each responsive to different undesired operating conditions in each stage for actuating the controlling means, and other switching means for preventing the actuation of the control electrode and space current switching means except in a predetermined order.

In witness whereof, I hereunto subscribe my name this 23rd day of January, 1928.

MILES E. FULTZ.